(12) United States Patent  (10) Patent No.: US 6,452,795 B1
Lee                       (45) Date of Patent:     Sep. 17, 2002

(54) BATTERY PACK WITH SUPPORT MECHANISM FOR NOTEBOOK

(75) Inventor: Yung-Tang Lee, Taipei (TW)

(73) Assignee: Inventec Appliances Corp., Taipei (TW)

( * ) Notice: Subject to any disclaimer, the term of this patent is extended or adjusted under 35 U.S.C. 154(b) by 6 days.

(21) Appl. No.: 09/711,291

(22) Filed: Nov. 14, 2000

(51) Int. Cl.[7] .................................................. G06F 1/16
(52) U.S. Cl. ..................... 361/686; 361/683; 361/727; 364/708.1; 429/98
(58) Field of Search ........................ 361/683, 679–682, 361/684–687, 724–727; 429/96–100; 16/110.5, 223, 110, 5; 364/708, 708.1; 312/223.1, 223.2; 200/52 R; 439/500

(56) References Cited

U.S. PATENT DOCUMENTS

| | | | | |
|---|---|---|---|---|
| 5,107,401 A | * | 4/1992 | Youn | 361/393 |
| 5,293,300 A | * | 3/1994 | Leung | 361/683 |
| 5,583,744 A | * | 12/1996 | Oguchi et al. | 361/683 |
| 5,594,617 A | * | 1/1997 | Foster et al. | 361/679 |
| 5,642,258 A | * | 6/1997 | Barrus et al. | 361/683 |
| 5,901,035 A | * | 5/1999 | Foster et al. | 361/683 |
| 6,002,583 A | * | 12/1999 | Shoji et al. | 361/683 |
| 6,078,496 A | * | 6/2000 | Oguchi et al. | 361/683 |
| 6,191,941 B1 | * | 2/2001 | Ito et al. | 361/683 |
| 6,307,740 B1 | * | 10/2001 | Foster et al. | 361/683 |

* cited by examiner

Primary Examiner—Darren Schuberg
Assistant Examiner—Michael Datskovsky
(74) Attorney, Agent, or Firm—Birch, Stewart, Kolasch & Birch, LLP

(57) ABSTRACT

A battery pack for notebook can raise the notebook above a supporting surface by a support mechanism. The support mechanism is extendably provided at the underside adjacent the hinge position of the housing and display of the notebook. The battery pack is operable to be either in a retracted position in the notebook or in an extended position from the notebook for supporting the notebook so as position the surface of keyboard at a predetermined optimal angle with respect to user.

11 Claims, 4 Drawing Sheets

BATTERY PACK WITH SUPPORT MECHANISM FOR NOTEBOOK

BACKGROUND OF THE INVENTION

1. Field of Invention

The present invention relates to support and more particularly to a battery pack for notebook with improved support characteristics.

2. Related Art

Computers has played a big role in our daily life. A variety of electronic data processing devices such as personal computers (PCs), notebooks, and personal digital assistants (PDAs) have been available. Generally speaking, these devices are fast, powerful and large in storage memory for fulfilling each individual need. It is important to note that convenience is also very important in designing above devices. As to notebook, it substantially comprises a housing and a display hinged to housing. As such, display may be pulled toward housing for ease of transportation and/or storage or in the other position wherein display is open to be angled with respect to housing for ease of operation. It is understood that the angle between display and housing may be adjusted so as to provide a better angle for viewing. Keyboard is provided on housing served as the major input device of computer. It is found that most of notebook computer operation time is keyboard operation time. As such, how to provide a user friendly keyboard operation environment is a major concern in designing notebook. Preferably, the surface of keyboard is at an oblique angle with respect to a supporting surface for sharing the burden of hands and ease of operation. Conventionally, a support mechanism is provided at a side of the underside for supporting the notebook in an oblique angle. At this position, the surface of keyboard is at an oblique angle with respect to user. User may adjust the angle to a desired one. Above design is preferred in a typical desk computer but it is undesired in notebook. The reason is detailed below. The keyboard of notebook is provided on housing. As such, support mechanism must bear the weight of notebook (including housing and display) and the force exerted by user's hands. As such, the structural strength of support mechanism must be carefully calculated in designing notebook for ensuring a stable construction without collapsing while operating. As a result, an undesired increase in the manufacturing cost is inevitable.

SUMMARY OF THE INVENTION

It is therefore an object of the present invention to provide a battery pack with support mechanism for notebook wherein the total weight of notebook and user's hands is supported by the angle adjustable support mechanism for carrying out an ergonomic design.

The advantages of the present invention are realized by providing a battery assembly for notebook wherein the battery assembly comprises a battery pack and a pair of joint mechanisms coupled between notebook and battery assembly such that battery pack is operable to be either in a retracted position in the notebook or in an extended position for supporting the notebook so as to position the surface of keyboard at a predetermined optimal angle with respect to user.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1:
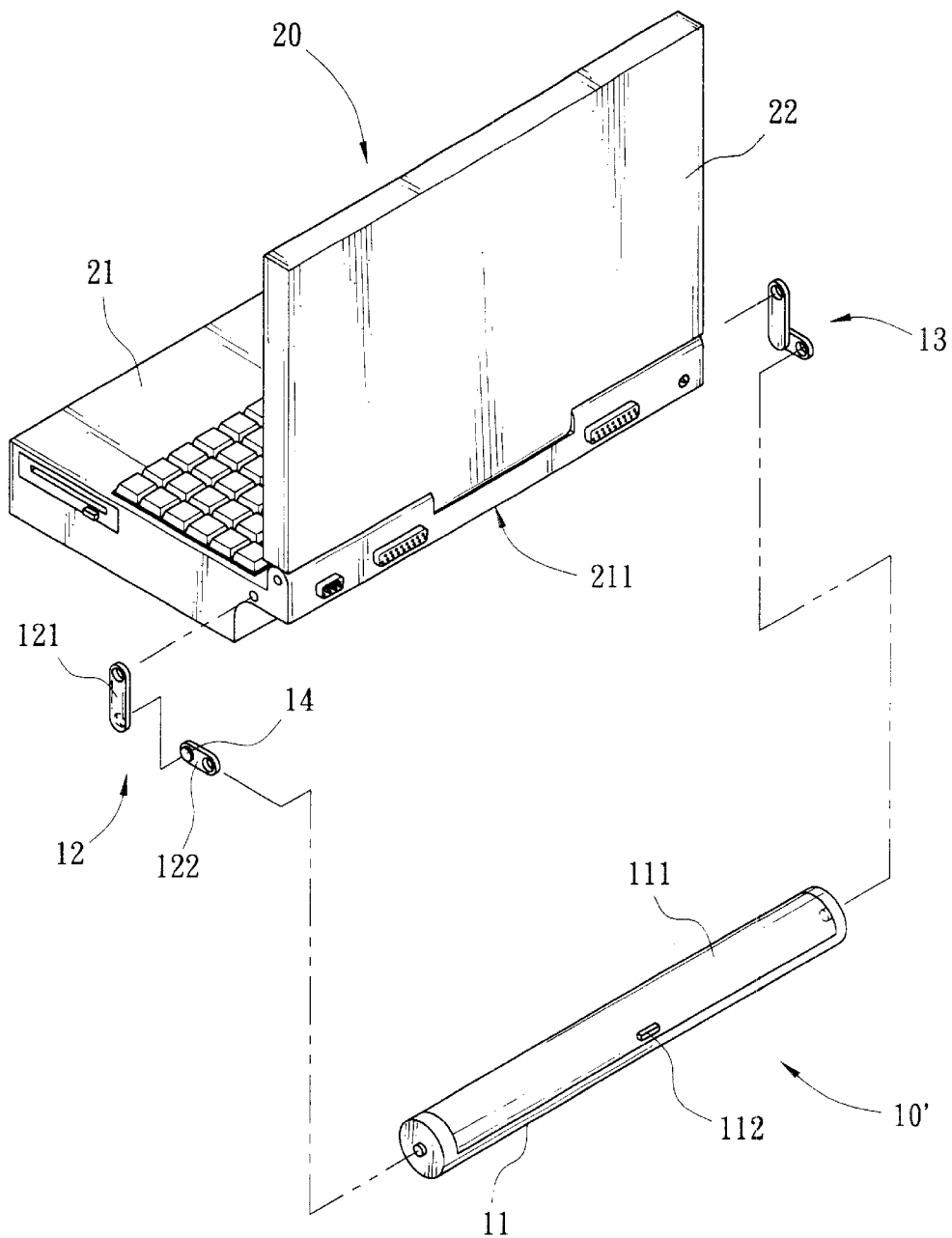
FIG. 1 is an exploded view of a first preferred embodiment of battery assembly mounted on a notebook according to the invention.

Referring to FIG. 1, there is shown a battery assembly 10 mounted on a notebook 20 constructed in accordance with the invention. Notebook 20 comprises a housing 21 and a display 22 hinged to housing 21. As such, display 22 may be pulled toward housing 21 for ease of transportation and storage or in a second position wherein display 22 is open to be angled with respect to housing 21 for ease of operation. A recess 211 is provided adjacent the hinged position of housing 21 and display 22 for receiving battery assembly 10. Battery assembly 10 comprises a hollow cylindrical battery pack 11 for providing a battery (not shown) recess 211 and a pair of joint mechanisms 12, 13. A cover 111 is releasably secured to battery pack 11 so as to carry out the removal and insertion of batteries. A tab 112 is provided on the battery pack 11 for facilitating the manipulation of battery pack 11. Either joint mechanism 12 (or 13) comprises a long arm 121, a short arm 122, and a twist shaft 14 pivotably secured long arm 121 and short arm 122 together. One end of long arm 121 is pivotably secured to the recess 211 of housing 21, while one end of short arm 122 is pivotably secured to battery pack 11. As a result, battery pack 11 is pivotably secured to notebook 20.

Figure 2A:
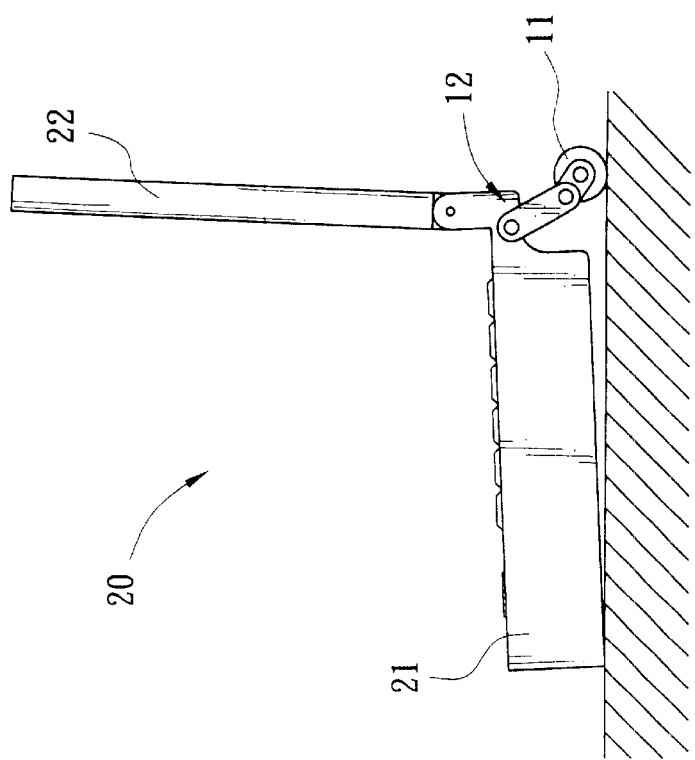
FIG. 2A is a side view of FIG. 1 illustrating the retracted battery assembly.

Referring to FIG. 2A, where battery pack 11 is pivoted to receive in the recess 211 of housing 21. This position, where battery assembly 10 received in notebook 20, is called a retracted position of battery assembly 10.

Figure 2B:
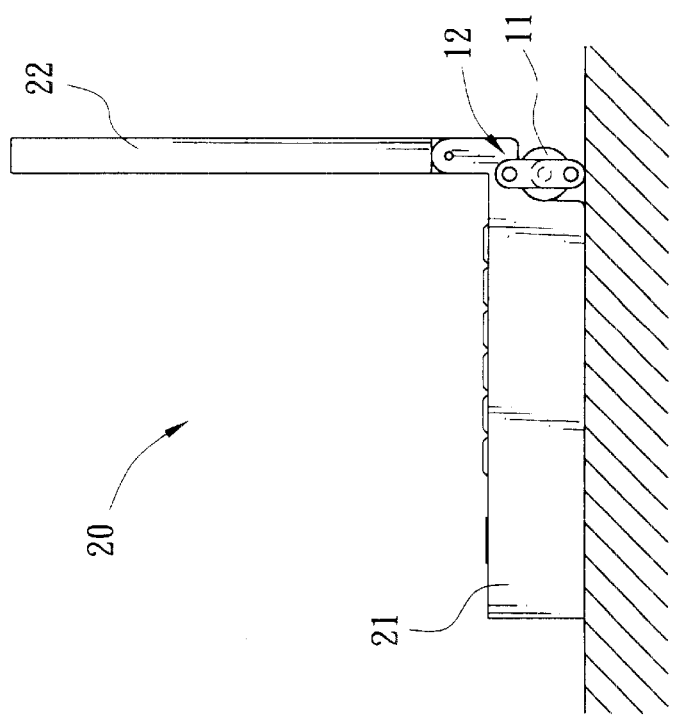
FIG. 2B is a view similar to FIG. 1 illustrating the extended battery assembly.

Referring to FIG. 2B, tab 112 is operated to pull battery pack 11 out of notebook 20 so as to raise the hinged position of housing 21 and display 22. That is, the surface of keyboard 23 of notebook 20 is positioned at a predetermined angle with respect to user. At this support position of battery assembly 10, notebook 20 is raised by battery assembly 10. To the contrary, in the retracted position battery assembly 10 is pushed back to receive in notebook 20 for saving storage space. With the design of pivotal twist shaft 14 of the invention, the angle of long arm 121 with respect to short arm 122 may be adjusted and secured there. As a result, the angle of notebook 20 with respect to a planar supporting surface may be adjusted by the raised housing 21 so as to position the notebook 20 at a predetermined optimal angle with respect to user. Also, in the support position of notebook 20 where battery assembly 10 extended from recess 211, a larger heat dissipation space is formed for enhancing the heat dissipation capability of notebook 20 during operating.

Figure 3:
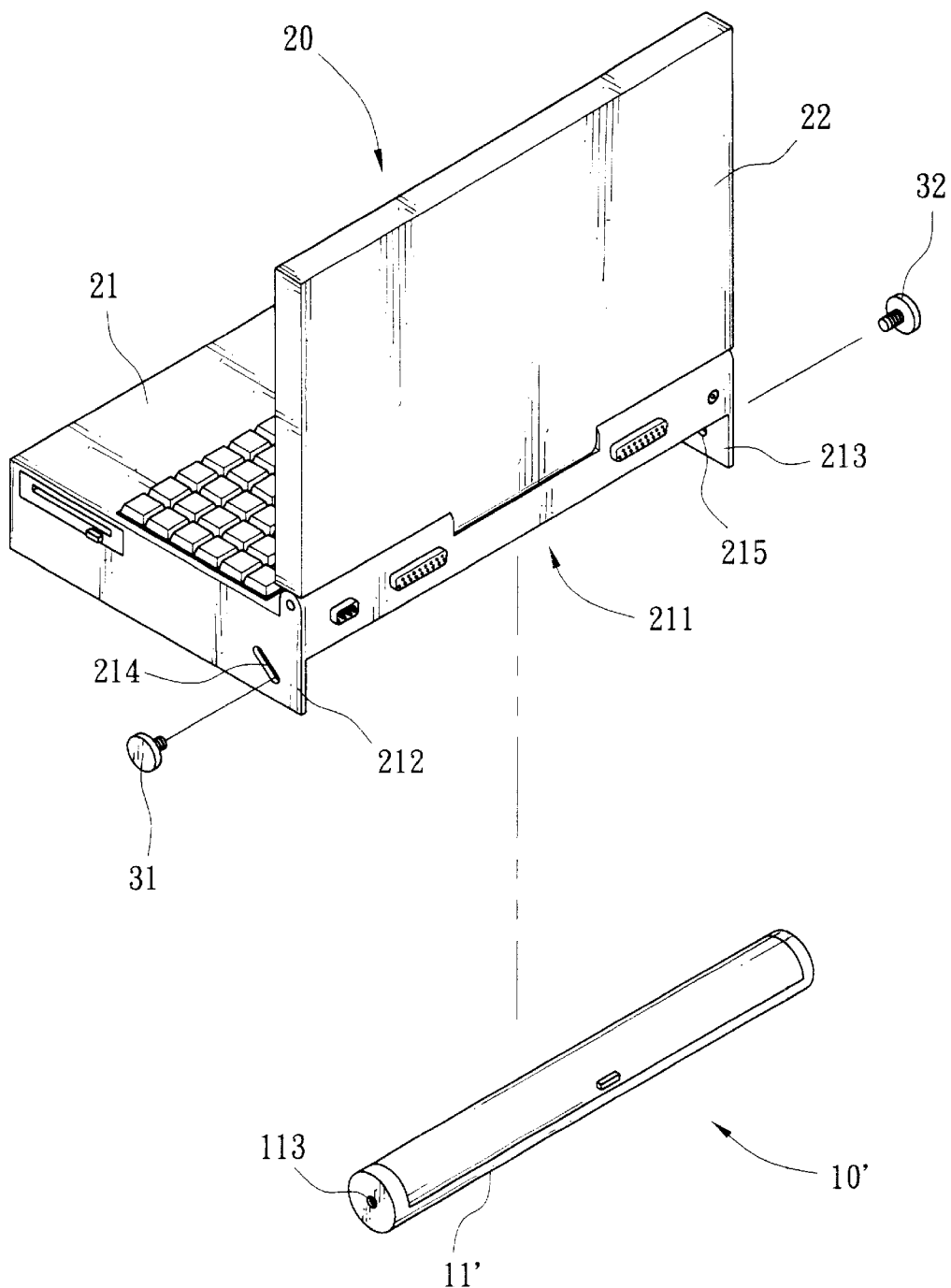
FIG. 3 is an exploded view of a second preferred embodiment of battery assembly mounted on a notebook according to the invention.

Referring to FIG. 3, a second embodiment of the invention is shown. The differences between the first and second embodiments are detailed below. The joint mechanism 12 of first embodiment is replaced by a mechanism detailed below. Two walls 212, 213 are provided on both ends of recess 211 of housing 21. A downward slanted elongate groove 214 (or 215) is formed on wall 212 (or 213). Correspondingly, a threaded hole 113' is formed on either end of battery pack 11' of battery assembly 10'. A threaded portion of fastener 31 (or 32) is inserted through groove 214 (or 215) to secure in threaded hole 113' so as to slidably fasten battery pack 11' to walls 212, 213. That is, battery pack 11' is confined to move along grooves 214 and 215.

Figure 4:
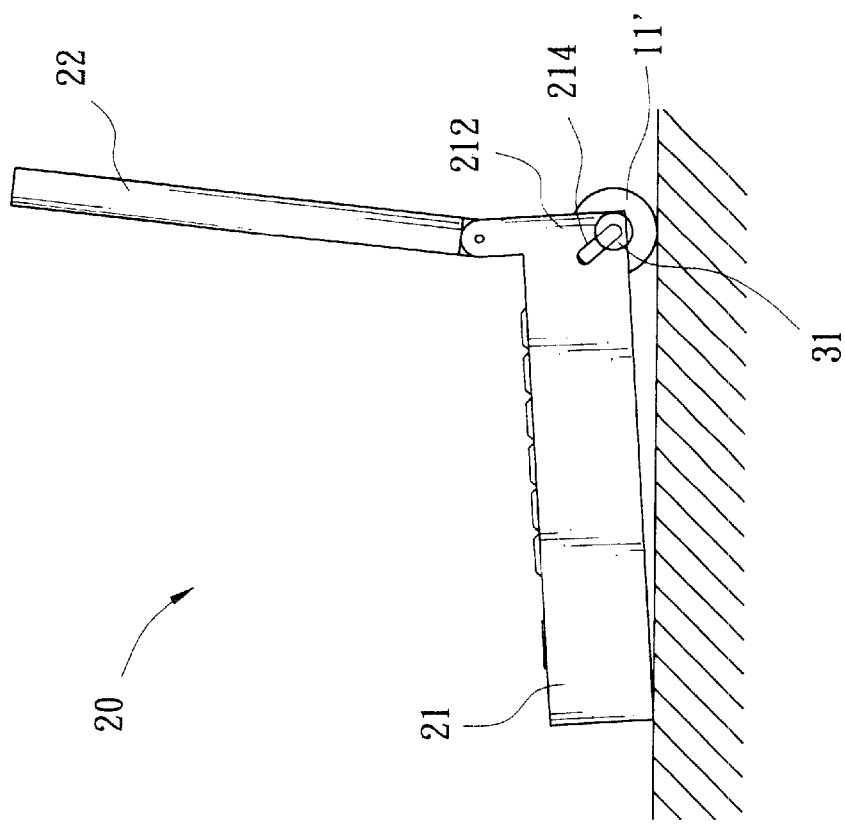
FIG. 4 is a side view of FIG. 1 illustrating the extended battery assembly.

Referring to FIG. 4, it is understood that battery assembly 10' is pivotably secured to notebook 20. That is, battery assembly 10' may be retracted to recess 211 in the retracted position or extended from recess 211 in the extended position by adjusting the position of battery assembly 10' by unfastening and subsequently fastening the fasteners 31, 32. In the support position of battery assembly 10', notebook 20 is raised by battery assembly 10'. As a result, the surface of keyboard 23 of notebook 20 with respect to a planar supporting surface may be adjusted by the raised housing 21 so as to position the notebook 20 at a predetermined optimal angle with respect to user. Similarly, the raised position of battery assembly 10' may be adjusted by changing the position of battery assembly 10' in grooves 214 and 215.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery assembly mounted on a notebook including a housing, a display hinged to the housing, and a recess at the underside adjacent the hinged position of the housing and the display, the battery assembly comprising:

a battery pack received in the recess, the battery pack having a tab for facilitating the manipulation thereof; and a pair of pivotal joint mechanisms each having one end pivotably secured to the recess and the other end pivotably secured to the battery pack, wherein the battery pack is operable to be either in a retracted position in the notebook or in an extended position from the notebook for supporting and positioning the notebook at a predetermined angle with respect to a supporting surface.

2. The battery assembly of claim 1, wherein the battery pack is a hollow cylinder for providing a receiving space, and the battery pack comprises a cover in covering relation with respect to the receiving space.

3. The battery assembly of claim 1, wherein each of the joint mechanisms comprises a long arm and a short arm pivotably secured to the long arm.

4. The battery assembly of claim 3, wherein each of the joint mechanisms comprises a twist shaft pivotably securing the long arm and the short arm together.

5. An electronic data processing device comprising:

a housing having a recess at the underside, two walls on both ends of the recess, and two downward slanted elongate grooves on the walls;

a battery pack for receiving at least one battery, the battery pack being receivable in the recess so as to be either in a retracted position in the notebook or in an extended position from the notebook for supporting and positioning the notebook at a predetermined angle with respect to a supporting surface; and a pair of fasteners secured to the battery pack by passing through the grooves.

6. The device of claim 5, wherein the battery pack is a hollow cylinder for providing a receiving space, and the battery pack comprises a cover in covering relation with respect to the receiving space.

7. The device of claim 5, wherein the battery pack further comprises a tab for facilitating the manipulation thereof.

8. The device of claim 5, wherein the battery pack further comprises a threaded hole on either end for receiving the fastener.

9. A battery assembly mounted on a notebook including a housing, a display hinged to the housing, and a recess at the underside adjacent the hinged position of the housing and the display, the battery assembly comprising:

a battery pack received in the recess; and a pair of pivotal joint mechanisms each having one end pivotably secured to the recess and the other end pivotably secured to the battery pack, wherein each of the joint mechanisms comprises a long arm and a short arm pivotably secured to the long arm, wherein the battery pack is operable to be either in a retracted position in the notebook or in an extended position from the notebook for supporting and positioning the notebook at a predetermined angle with respect to a supporting surface.

10. The battery assembly of claim 9, wherein the battery pack is a hollow cylinder for providing a receiving space, and the battery pack comprises a cover in covering relation with respect to the receiving space.

11. The battery assembly of claim 9, wherein each of the joint mechanisms comprises a twist shaft pivotably securing the long arm and the short arm together.

* * * * *